United States Patent [19]
Benjey

[11] Patent Number: 6,155,316
[45] Date of Patent: Dec. 5, 2000

[54] CAPLESS FUEL TANK FILLER ASSEMBLY

[75] Inventor: Robert P. Benjey, Dexter, Mich.

[73] Assignee: Eaton Corporation, Cleveland, Ohio

[21] Appl. No.: 09/345,232

[22] Filed: Jun. 30, 1999

[51] Int. Cl.[7] ...................................................... B65B 1/04
[52] U.S. Cl. .......................... 141/348; 141/302; 220/86.2
[58] Field of Search ...................................... 141/301, 302, 141/305, 307, 348, 350; 220/86.2

[56] References Cited

U.S. PATENT DOCUMENTS 5,848,626  12/1998  Kim .
5,960,839  10/1999  Armesto et al. .
6,009,920   1/2000  Palvoelgyi et al. .

Primary Examiner—Steven O. Douglas
Attorney, Agent, or Firm—Roger A. Johnston

[57] ABSTRACT

A capless fuel filler neck has an annular resilient seal which seals over a fuel nozzle upon insertion in the filler tube. Further insertion of the nozzle opens a flapper biased against a rim flange on the lower end of annular seal. Movement of the flapper by the nozzle also moves an auxiliary seal on the flapper and which opens separate venting passages disposed externally of the nozzle tube. Upon removal of the nozzle from the filler tube, the flapper closes against the rim flange to seal the filler tube; and, the auxiliary seals close and seal the vent tubes. The vent tubes serve to prevent spray-back of fuel when the nozzle opens the flapper in a tank with pressurized vapor and fuel trapped in the filler tube and to provide an air inlet path to accommodate the aspiration of the refueling nozzle.

11 Claims, 3 Drawing Sheets

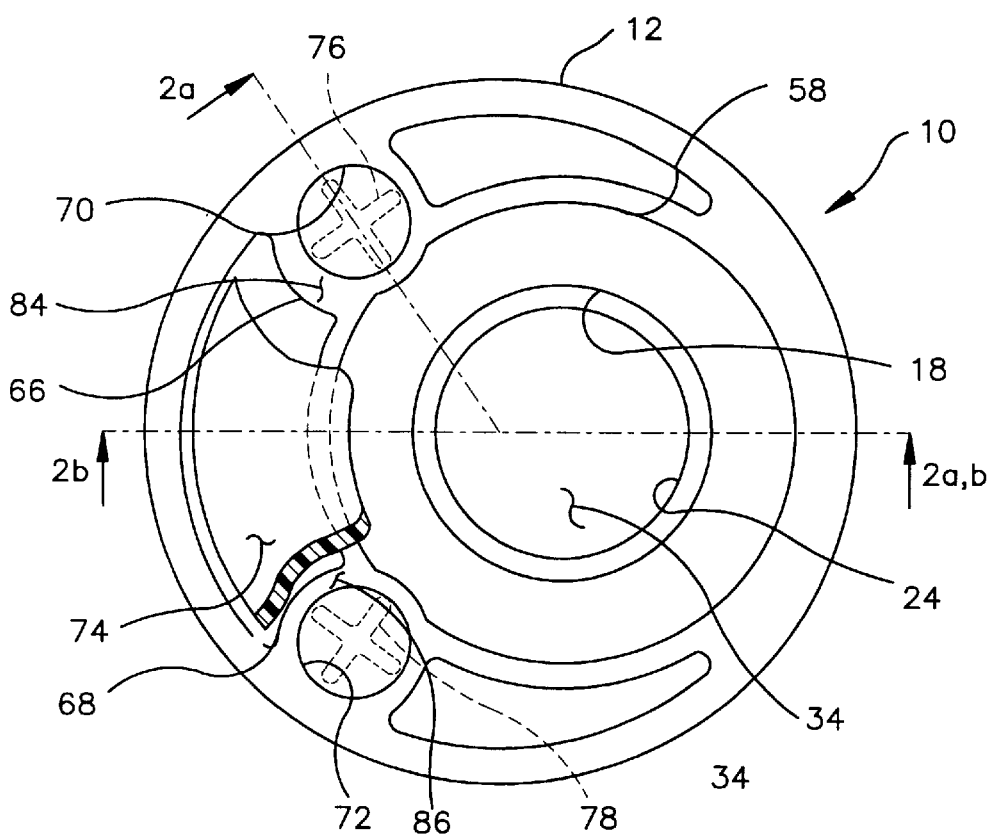

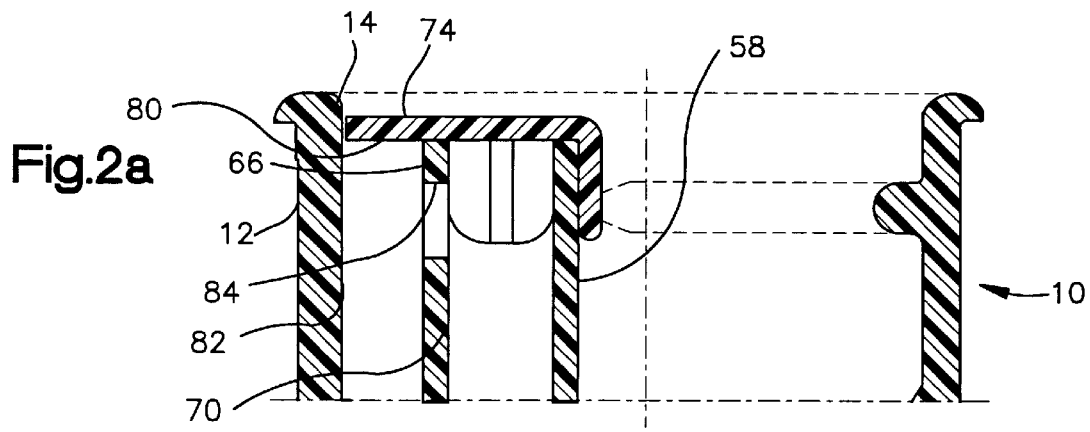
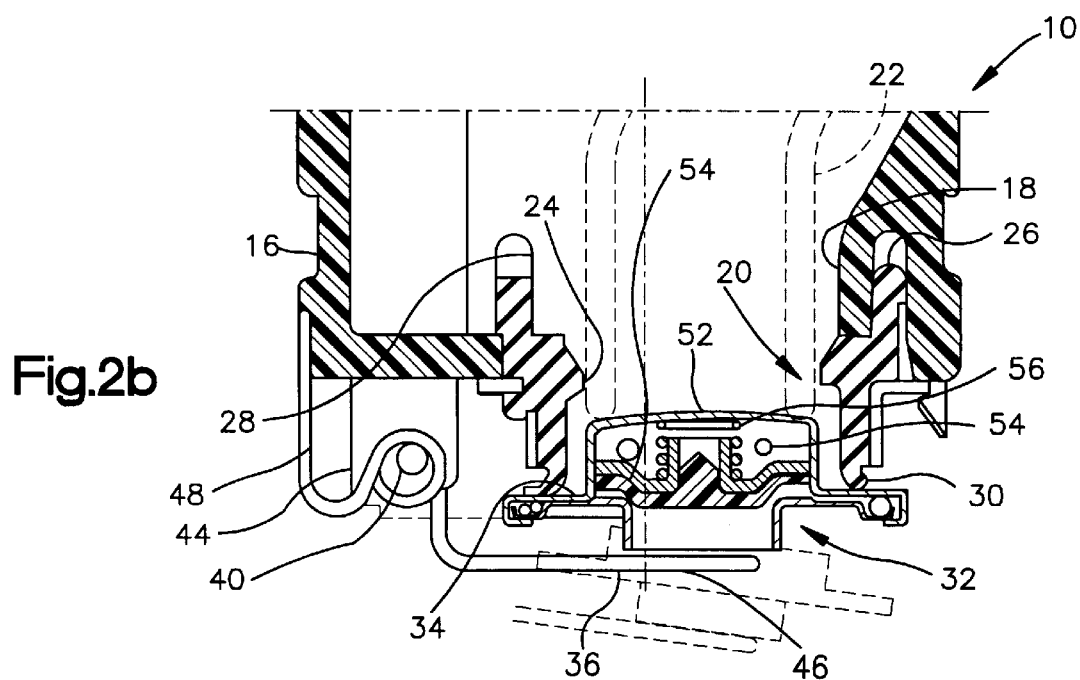

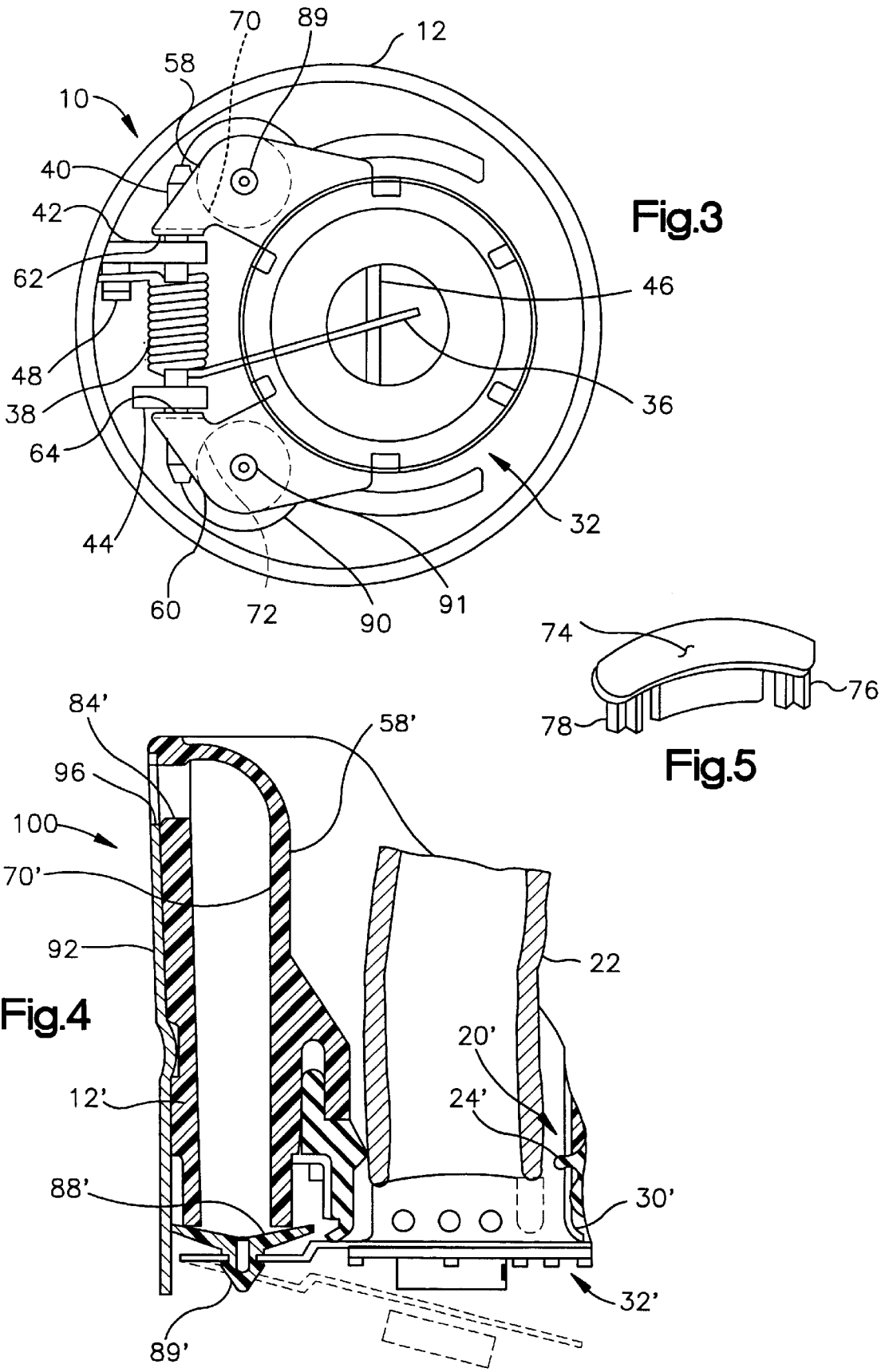

CAPLESS FUEL TANK FILLER ASSEMBLY

BACKGROUND OF THE INVENTION

The present invention relates to fuel filler necks for motor vehicle fuel tanks and more particularly relates to such filler neck assemblies of the type wherein it is desired not to have a cap or closure on the upper or fuel dispensing nozzle receiving end of the filler neck.

In the design and manufacture of motor vehicles it has become commonplace to provide a fuel filler access door on the outer surface of the vehicle and to provide the fuel dispensing nozzle end of the tank filler neck within a closed cavity formed in the vehicle body structure. Typically the filler neck cavity is accessible through a hinged filler door provided in the exterior of the vehicle body. In such arrangements, the filler neck closure or cap is relied upon for sealing the filler neck to prevent escape of fuel vapors to the atmosphere. However, if, after removal of the cap for refueling the user does not reinstall the cap properly or not completely tight, a not altogether infrequent occurrence, fuel vapors are permitted to escape to the atmosphere.

Currently most fuel filler neck installations employ a bulkhead or partition within the filler neck having an aperture sized to receive the nozzle for only the appropriate fuel, the aperture being closed by a non sealing trap door or spring biased flapper when the dispensing nozzle is removed.

It has been proposed to eliminate the cap on the fuel filler tube or neck and to rely on the biased flapper for automatically sealing the filler tube when the refueling operation has been completed and the nozzle withdrawn from the filler tube. The proposal is complicated by the tendency of the fuel to "spray-back" when a refueling nozzle is inserted in the filler tube for refueling with liquid fuel trapped above the bulkhead by the flapper and residual vapor pressure present in the tank.

Thus, it has been desired to find a way or means of providing a capless fuel tank filler neck which provides spray-back free venting from a pressurized tank condition when a refueling nozzle is inserted in the filler tube. This same structure must provide an air inlet path to support the refueling nozzle aspirator and a vapor tight seal to atmosphere upon removal of the nozzle from the capless filler tube.

BRIEF SUMMARY OF THE INVENTION

The present invention provides a capless fuel filler neck or tube for filling a motor vehicle fuel tank from a user inserted dispensing nozzle, which filler neck is of the type having a bulkhead or partition having a reduced diameter nozzle receiving orifice disposed in the filler tube and having a trap door or hinged flapper for sealing the orifice upon removal of the nozzle. The filler tube of the present invention has at least one separate venting passage disposed along the filler tube for venting fuel upon opening of the flapper by insertion of a nozzle for refueling.

The hinged flapper or trap door of the present invention is located between an annular seal in the filler tube, which seals about the nozzle upon user insertion and the end of the filler neck connected to the fuel tank. Upon removal of the nozzle, the hinged flapper effects a seal about the nozzle aperture in the filler neck and also a separate seal about at least one vent passage such that upon user insertion of the nozzle, sealing about the nozzle is effected initially by an annular seal, followed by opening of the flapper seal about the filler aperture and subsequent opening of the flapper seal to the vent passage. Thus the vent passage is opened whenever the refueling nozzle is inserted in the filler neck to a depth opening the hinged flapper. This assures that venting of trapped fuel will be provided during refueling to prevent "spray-back"; and, upon removal of the nozzle from the filler tube the hinged flapper is biased shut by a spring sealing both the vent passage and the refueling nozzle aperture in the filler tube. In one embodiment the vent passage is discharged through the sidewall of the filler tube; and, in another embodiment the vent passage discharges to a baffled chamber in the filler tube in the upper region thereof. If desired, the hinged flapper or trap door may include a pressure relief valve.

BRIEF DESCRIPTION OF THE DRAWINGS

FIG. 1 is a top view of the nozzle receiving end of the filler tube assembly of the present invention;

FIG. 2a is a section view taken along section indicating lines 2a—2a of FIG. 1;

FIG. 2b is a section view taken along section indicating lines 2b—2b of FIG. 1;

FIG. 3 is a bottom view of the filler tube of FIG. 1;

FIG. 4 is a section view similar to FIG. 2a of another embodiment of the invention; and, FIG. 5 is a perspective view of the plastic baffle insert for the embodiment of FIG. 1.

DETAILED DESCRIPTION OF THE INVENTION

Referring to FIGS. 1 through 3 and 5, the filler tube assembly of the present invention is indicated generally at 10 and includes a tubular member 12 having an open upper end 14 and a transverse partition or bulkhead 16 formed therein which has a reduced diameter aperture 18 disposed therein and has a resilient annular seal indicated generally at 20 provided therein which is operative upon insertion of a refueling nozzle 22, indicated by dashed outline in FIG. 2b and solid outline in FIG. 4, to seal about the periphery of the nozzle 22.

The resilient annular seal 20 has a bulbous rim portion 26 which is received in an annular groove 28 formed in the lower end of the filler tube 12 and is radially compressed therein for retaining and sealing the resilient seal 20 in its position thereon.

The annular seal member 20 has a second sealing surface provided on the lower end thereof in the form of a resilient annular lip or rim flange 30 which extends outwardly radially in a downward direction from the filler tube 12 and has sealed thereagainst the upper surface 34 of a flapper or trap door indicated generally at 32. The upper surface 34 is biased against the rim flange 30 in sealing engagement by one end 36 of torsion spring 38. Spring 38 is received over a shaft or pin 40 anchored in projections 42, 44 provided on the wall or partition 16 of the tube 12. A spring anchor lug 46 is provided on the undersurface of the flapper 32 against which the end 36 of spring 38 is registered. The opposite end 48 of the torsion spring 38 is registered against another lug or projection 48 provided on the lower surface of the bulkhead 16.

In the presently preferred practice of the invention, a pressure relief valve 50 is provided in the flapper 32 to provide emergency relief of any overpressure in the fuel tank which could cause rupture of the tank. The pressure relief valve communicates with the interior of a cup-shaped member 52 disposed over the upper surface 34 of the flapper which member 52 has a plurality of apertures 54 provided therein to permit vapors to escape into the upper region of the filler tube upon opening of the valve 50. It will be understood that the pressure relief valve is biased to the closed position by a spring 56 which provides a preset pressure threshold below which valve 50 remains closed.

Referring to FIG. 3, the flapper valve 32 has a pair of arms 58, 60 extending outwardly therefrom which have right angle tabs respectively 62, 64 formed thereon which have apertures therein with pin 40 passing therethrough to thereby provide a pivot axis for the flapper 32.

Referring to FIGS. 1, 2a and 2b, the filler tube has formed interiorly thereof a smaller diameter tubular region denoted by reference numeral 58 which communicates with the aperture 18 for the filler nozzle with the tubular region 58 sized to guide the filler nozzle into the aperture 18. The filler tube structure 12 has auxiliary wall portions formed therein which are outside of the tubular region 58 as denoted by reference numerals 66, 68 and which each respectively form a vent passage 70, 72 in spaced parallel arrangement with the interior 58 of the filler tube nozzle region. It will be understood that each of the passages 64, 66 extends downwardly and terminates at a longitudinal station generally coincident with the seal lip 30. The upper end of passages 70, 72 are open to the interior of the tube 12. Wall portions 66, 68 and the outer periphery of the wall of tube 58 form an open cavity 82. A suitable baffle cap 74 is disposed over the upper ends of the passages 70, 72; and, the cap 74 has a pair of fluted projections 76, 78 (see FIG. 5) extending therefrom which frictionally interfit the upper ends of the passages 70, 72 respectively retaining the cap over the ends of the vent passages and providing a baffle plate over the upper end of cavity 82. Cap 74 has a flange portion 80 which extends over the open cavity 82 formed between the partitions 66, 68 to baffle the end of the cavity 82.

Each of the vent passages 70, 72 has provided therein adjacent the upper end thereof a cross port denoted respectively 84, 86, one of which is shown in solid outline in FIG. 2a with both ports 84, 86 shown in dashed outline in FIG. 1. Ports 84, 86 thus vent fuel vapor from passages 70, 72 to cavity 82 which is open to the atmosphere, but baffled by flange 80 of cap 74. During a refueling event, air is allowed to flow from cavity 82 through vent passages 70, 72 to the filler neck tube 12.

Referring to FIG. 4, an alternate embodiment of the invention is indicated generally at 100 in which the filler tube 12' has a nozzle tube portion 58' of reduced diameter provided with a resilient annular seal 20' with sealing surface 24' for engaging the exterior of the nozzle. A lower-end resilient sealing rim flange 30' is provided upon which is sealed the flapper valve indicated generally at 32'. The flapper 32' is shown in solid outline in the closed position in FIG. 4 and in the open position in dashed outline.

The vent passages in the embodiment 100 of FIG. 4 are formed on the interior wall of the tube 12' one of which is shown in FIG. 4 and denoted by reference numeral 70' and has the upper end thereof closed to the interior of the tube 12'. The cross port 84' is formed in the wall of the tube 12' to communicate passage 70' with the exterior thereof.

With continuing reference to FIG. 4, the lower end of the vent passage 70' is terminated at generally the same longitudinal station as the end flange seal 30'; and, flapper 32' has provided thereon a pair of resilient auxiliary seal members, one of which is shown in FIG. 4 and denoted by reference numeral 88' and which is disposed over the lower end of vent passage 70'. It will be understood that similar resilient seals are also provided on the flapper 32 of the embodiment of FIG. 3 and denoted by reference numerals 88, 90 in FIG. 3 for closing passages 70, 72, respectively.

Referring to FIG. 4 in the present practice of the invention embodiment 100 the auxiliary seal 88' is secured to flapper 32' by a projection 89 formed thereon which extends through an aperture formed in the flapper 32'.

Similarly with respect to the embodiment 10 of FIGS. 1 through 3, auxiliary seal 80 is secured to flapper 32 by projection 81 formed thereon extending through the flapper; and, auxiliary seal 90 is secured to flapper 32 by a projection 91 formed thereon extending through an aperture in the flapper 32. In the embodiment 100 of FIG. 4, the filler tube 12' is shown received in a support tube 92 which has a hole 96 provided therein to permit the vent cross-passage 84' to discharge outside the filler tube.

In operation, both embodiments 10 and 100 operate in the same manner. Upon user insertion of the nozzle 22 into the seal 20, 20' until the end of the nozzle contacts the flapper 30, 32'; and, upon further insertion by the user thereupon moving the flapper downwardly to the open position shown in dashed outline in FIGS. 2b and 4 opening the rim seal 30, 30' and the vent passages 70, 72, 70'.

Upon removal of the nozzle 22 auxiliary seal 88', 88, 90 closes the respective vent passages followed by closure of the flapper on the rim seals 30, 30'.

The present invention thus provides a unique and novel technique for venting and closing a capless fuel tank filler neck by providing auxiliary vent passages disposed in parallel relationship exteriorly of the nozzle receiving tube which vent passages are commonly opened and closed by the nozzle trap door or flapper valve provided in the filler neck.

Although the invention has hereinabove been described with respect to the illustrated embodiments, it will be understood that the invention is capable of modification and variation and is limited only by the following claims.

What is claimed is:

1. A filler tube assembly for preventing spray-back during refueling of a vehicle fuel tank comprising:

(a) a tube structure defining a fill passage having a first end connected to the fuel tank and a second end opposite said first end open for refueling through an access port on the vehicle;

(b) said tube structure also defining a vent passage disposed alongside said filler passage and having a first end communicating with the atmosphere and a second end communicating with said tank;

(c) a resilient structure defining a first annular seal in said filler tube, said seal operable, upon insertion of a refueling nozzle in said tube, for sealing about said nozzle, said resilient structure defining a second annular seal disposed along said filler passage between said first seal and said tank;

(d) a valve member disposed for movement with respect to said tube structure, said valve member including a first sealing surface operable to seal about said second annular seal and a second sealing surface operable to seal about said second end of said vent passage, wherein upon insertion of said refueling nozzle into said filler passage second end said nozzle initially is sealed about by said first annular seal and upon continued insertion of said nozzle in said filler passage, said valve member is moved progressively to first unseal said second annular seal and then unseal said second end of said vent passage; wherein upon filling of said tank to a full level where fuel enters said vent passage for discharge through said first end of said vent passage, wherein upon withdrawal of said refueling nozzle from said filler passage, said second sealing surface closes second end of said vent passage before said first sealing surface closes said first end of said filler passage.

2. The assembly defined in claim 1, wherein said valve member is mounted for pivotal movement on said tube structure.

3. The assembly defined in claim 1, wherein said second sealing surface is formed on a resilient sealing member provided on said moveable valve member.

4. The assembly defined in claim 1, wherein said second annular seal includes a flexible annular lip.

5. The assembly defined in claim 1, further including a plurality of said vent passages with one of said second sealing surface disposed for closing the second end of each of said plurality of vent passages.

6. The assembly defined in claim 1, wherein said vent passage is disposed in generally spaced parallel arrangement with said fill passage.

7. The assembly defined in claim 1, wherein said first annular seal and said second annular seal are formed integrally in a one piece configuration.

8. A method of controlling spray-back during refueling of a vehicle fuel tank from a user operated dispensing nozzle comprising:

(a) disposing a seal in a filler tube for the fuel tank and sealing about the dispensing nozzle upon user insertion thereof in the filler tube to a first position;

(b) forming a venting passage communicating the interior of said filler tube with the atmosphere;

(c) disposing a valve member in said tube for movement about a pivot and providing a first and second sealing surface on said valve member with said second sealing surface further from said pivot than said first sealing surface;

(d) biasing said valve member in a direction causing said second sealing surface to seal said filler tube and causing said first sealing surface to seal said vent passage; and, (e) contacting said valve member upon further insertion of said nozzle to a second position beyond said first position and moving said valve member progressively with said nozzle about said pivot and sequentially unsealing said second sealing surface from said filler tube and then said first sealing surface from said vent passage.

9. The method defined in claim 3, wherein said step of pivoting a valve member includes disposing an auxiliary pressure relief valve in said moveable valve member.

10. The method defined in claim 8, wherein said step of moving said seal member includes closing said vent passage and moving said valve member to the closed position upon user removal of said nozzle from said filler tube.

11. The method defined in claim 8, wherein said step of forming a first sealing surface includes forming a flexible disc-like member and attaching said disc-like member to said valve member.

\* \* \* \* \*